Patented May 18, 1948

2,441,799

UNITED STATES PATENT OFFICE 2,441,799

INTERPOLYMER OF DIALLYL FUMARATE AND MODIFIED UNSATURATED ALKYD RESIN

Gaetano F. D'Alelio, Shaker Heights, Ohio, assignor to General Electric Company, a corporation of New York No Drawing. Original application October 31, 1939, Serial No. 302,174, now Patent No. 2,428,788, dated October 14, 1947. Divided and this application November 12, 1946, Serial No. 709,102

4 Claims. (Cl. 260—45.4)

This application is a division of my copending application Serial No. 302,174, filed October 31, 1939, now Patent No. 2,428,788, issued October 14, 1947, and assigned to the same assignee as the present invention.

This invention relates to the production of new materials having valuable and characteristic properties that make them especially suitable for use in industry, for example in molding, laminating, casting, coating and adhesive applications, and for other purposes. The invention is concerned more particularly with compositions of matter comprising an interpolymer (copolymer) or interpolymers of at least one polymerizable esterification product of at least one polyhydric alcohol, at least one alpha unsaturate alpha beta polycarboxylic acid and at least one non-ethylenic polycarboxylic acid (hereafter for brevity designated generally as a "non-ethylenic-modified unsaturated alkyd resin") with at least one polymerizable monohydric alcohol ester of an alpha unsaturated alpha beta polycarboxylic acid.

A practical advantage accruing from my invention is that it provides new compositions especially adapted for the production of cast or molded massive bodies. The polymerizable non-ethylenic-modified unsaturated alkyd resins alone are unsuited, even in the presence of polymerization catalysts such as peroxides, for the preparation of practically useful cast or molded articles of substantial size. If effort be made to prepare commercially useful massive bodies from such alkyd resins alone, even prolonged heat treatment in the presence of a polymerization catalyst usually gives unsuitable materials. The cast or molded articles often are soft, rubbery masses (even after heat treatment for 24 hours at elevated temperatures) or, if hard bodies, frequently are filled with bubbles or show cracks, or both, when cured.

In the application of Birger W. Nordlander and Gerald Margrave, Serial No. 302,164, filed October 31, 1939, now abandoned, and assigned to the same assignee as the present invention, are disclosed and claimed interpolymerization products of unsaturated alkyd resins and polymerizable monohydric alcohol esters of alpha unsaturated alpha beta polycarboxylic acids. I have discovered that advantages in addition to those set forth in the above-identified Nordlander et al. application accrue by internally modifying an unsaturated alkyd resin with a non-ethylenic polycarboxylic acid and forming a copolymer of the thus modified unsaturated alkyd resin with polymerizable monohydric alcohol esters of alpha unsaturated alpha beta polycarboxylic acids. For example, by forming copolymers with such components the high exothermic heat given off in forming copolymers with unmodified unsaturated alkyd resins is lessened. As a result, the internal strains in the copolymer are reduced to a minimum and relatively strain-free, tough castings or molded articles can be obtained. Further, due to the lower cost of the common non-ethylenic polycarboxylic acids as compared with the alpha unsaturated alpha beta polycarboxylic acids, substantial economies in producing the finished article are attained. Also, it is extremely difficult to incorporate a polymerization catalyst into non-ethylenic-modified unsaturated alkyd resins due to their viscous nature. However, as the monohydric alcohol esters of alpha unsaturated alpha beta polycarboxylic acids are good dispersion mediums for the usual polymerization catalysts, there are no difficulties in incorporating a catalyst into the mixed or dissolved components. The copolymerization between the starting materials proceeds satisfactorily, yielding interpolymerization products having properties quite different from the properties of the individual components when polymerized under the same conditions and different from mechanical mixtures of the separately polymerized components.

Another practical advantage in copolymerizing a polymerizable non-ethylenic-modified unsaturated alkyd resin with a polymerizable monohydric alcohol ester of an alpha unsaturated alpha beta polycarboxylic acid rather than with other polymerizable materials such, for instance, as styrene, vinyl acetate, methyl methacrylate, etc., results from the relatively low vapor pressure of most of these monohydric alcohol esters. This is due to the fact that they are di-esters or, with aconitic acid, tri-esters. Thus, dimethyl itaconate, which is the lowest member of the itaconate series, boils at 108° C. at 11 mm. pressure or at about 220° C. at atmospheric pressure. In contrast therewith, the boiling points (at atmospheric pressure) of vinyl acetate, methyl methacrylate and styrene are, respectively, about 70° C., 100° C. and 146° C. The higher boiling points of the monohydric alcohol esters of alpha unsaturated alpha beta polycarboxylic acids therefore provide economies in manufacture, since there is little, if any, loss of material in forming a mixture or solution of the components under heat. The final product also is more uniform than when one of the components is a volatile monomer, a part of which may be lost during application of the material or during the copolymerization process.

Compositions produced in accordance with this invention also are particularly well adapted for use as "solventless varnishes," for instance as coating compositions and binders in the production of laminated sheets and tapes for use in insulating electrical devices, as well as for other applications.

In carrying the present invention into effect a polymerizable esterification product of a polyhydric alcohol, an alpha unsaturated alpha beta polycarboxylic acid and a non-ethylenic polycarboxylic acid is prepared in accordance with technique now well known to those skilled in the alkyd resin art. Any polyhydric alcohol containing at least two esterifiable aliphatic hydroxy groups, or mixtures of such alcohols, may be used in preparing the non-ethylenic-modified unsaturated alkyd resin. Examples of such polyhydric alcohols are ethylene glycol, di-, tri- and tetra-ethylene glycols, propylene glycol, trimethylene glycol, thiodiglycol, glycerine, pentaerythritol, etc. Any alpha unsaturated alpha beta polycarboxylic acid, or mixtures of such acids, may be reacted with the polyhydric alcohol or alcohols to form the unsaturated alkyd resin. Examples of such polycarboxylic acids are maleic, monohalomaleic, fumaric, monohalofumaric, citraconic, mesaconic, acetylene dicarboxylic, aconitic, itaconic and its homologues as, for instance, alpha methyl itaconic acid, alpha ethyl itaconic acid, alpha alpha dimethyl itaconic acid, etc.

Various non-ethylenic polycarboxylic acids in widely varying amounts may be incorporated into the unsaturated alkyd resin, care being taken that the amount employed is not such as to render the said alkyd resin non-polymerizable, or, more particularly, non-copolymerizable with the monohydric alcohol ester component of the starting mixture or solution. In producing the modified unsaturated alkyd resins used in carrying the present invention into effect, the non-ethylenic polycarboxylic acid ordinarily will not exceed substantially 75 mol per cent of the alpha unsaturated alpha beta polycarboxylic acid. Illustrative examples of non-ethylenic polycarboxylic acids which may be used are saturated aliphatic polycarboxylic acids such, for example, as succinic, adipic, glutaric, pimelic, sebacic, azelaic, suberic, tricarballylic, etc., the non-ethylenic cycloaliphatic polycarboxylic acids, e. g., the cyclopropane dicarboxylic acids, the cyclohexane dicarboxylic acids, the alkyl cycloalkane polycarboxylic acids, etc., the aromatic polycarboxylic acids, e. g., phthalic, benzoyl phthalic, terephthalic, benzophenone-2,4' dicarboxylic, etc., the hydroxy saturated polycarboxylic acids, e. g., citric, tartaric, etc., and similar substances.

The monohydric alcohol esters of alpha unsaturated alpha beta polycarboxylic acids which are utilized in producing the new interpolymerization products of this invention may be considered as being members of the class of polymerizable organic esters containing the structure

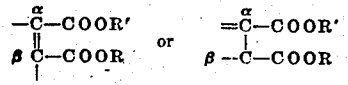

That is, they are polymerizable esters in which the alpha carbon atom is unsaturated and in which the alpha and beta carbon atoms are attached to carbalkoxy groups. R and R' of the above grouping may be any substituted or unsubstituted hydrocarbon radical derived from a monohydric alcohol, that is, an organic compound having one and only one esterifiable hydroxy radical. In other words, R and R' of the above grouping may be any normal or branched chain, saturated or unsaturated alkyl radicals with or without substituent groupings, or aryl radicals, polynuclear aromatic radicals, hydrocyclic radicals, etc., and they may be the same or different. The solubility or compatibility of the nonethylenic-modified unsaturated alkyd resin with the monohydric alcohol ester depends, for example, upon the particular polyhydric alcohol used in making the resin and the length of the monohydric alcohol ester radical. Illustrative examples of the monohydric alcohol esters which may be used in carrying the present invention into effect are the symmetrical and unsymmetrical diesters such, for instance, as the dimethyl, diethyl, dipropyl, diisopropyl, dibutyl, diisobutyl, di-secondary butyl, diamyl, diisoamyl, dihexyl, dioctyl, didecyl, methyl ethyl, methyl propyl, propyl butyl, diallyl, dimethallyl, diethallyl, dipropallyl, allyl methallyl, allyl ethallyl, dicrotyl, dipropargyl, di-(1-chlorallyl), di-(2-chlorallyl), di-(3-methyl allyl), divinyl, di-(2-phenyl allyl), di-(1-phenyl-2-propyn-1-yl), di-(3-methyl-4-nonyn-3-yl), di-(4-methyl-5-decyn-4-yl), di-(4-methyl-5-undecyn-4-yl), diphenyl, dibenzyl, di-(phenyl ethyl), dicyclohexyl, di-(methoxy ethyl), di-(ethoxy ethyl), etc., esters of maleic, monohalomaleic, fumaric, monohalofumaric, citraconic, mesaconic, acetylene dicarboxylic, itaconic acid and its homologues as, for instance, alpha methyl itaconic acid, alpha ethyl itaconic acid, alpha alpha dimethyl itaconic acid; etc.; and tri-esters such, for instance, as, tri-allyl aconitate, tri-methallyl aconitate, tributyl aconitate, etc.

To achieve copolymerization of the polymerizable non-ethylenic-modified unsaturated alkyd resin with the polymerizable monohydric alcohol ester of alpha unsaturated alpha beta polycarboxylic acid, a solution of the said resin in the said ester first preferably is effected. The monohydric alcohol ester advantageously may act as a carrier for a small amount of polymerization catalyst. Examples of polymerization catalysts which may be used are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, various per-compounds such as perborates, persulfates, perchlorates, etc., aluminum salts such as the halides, e. g., aluminum chloride, etc., organic and inorganic acids such as methacrylic, hydrofluoric, etc., metal compounds of the unsaturated acids as, for instance, cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole.

When rapidity of interpolymerization between the components is of secondary importance, copolymerization may be effected merely under the influence of heat, light, or heat and light and in the absence of an accelerator of polymerization. The rate of copolymerization and the properties of the final product vary with the time, temperature and, if a catalyst is used, also with the catalyst concentration. Copolymerization may be effected at from room temperature (20° to 30°

C.) to temperatures above 100° C., for example about 130° C., but ordinarily I use temperatures within the range of 60° to 120° C. in causing the mixed components to interpolymerize.

In order that those skilled in the art better may understand how the present invention may be carried into effect, the following examples are given by way of illustration. All parts are by weight. Reference is first made to the components, and proportions thereof, used in the preparation of the non-ethylenic-modified unsaturated alkyd resins. These resins (identified by letter designations) were copolymerized for varying periods of time with monohydric alcohol esters of alpha unsaturated alpha beta polycarboxylic acids, specifically diallyl itaconate and diallyl maleate, using 1 percent by weight of the mixed components of benzoyl peroxide as an accelerator of polymerization, to form cured interpolymerization products of such resistance to heat and ordinary solvents that they properly may be described as insoluble and infusible compositions.

*Non-ethylenic-modified unsaturated alkyd resin*

| Resin | Composition |
|---|---|
| A | ethylene glycol (62.05 parts), itaconic acid (32.51 parts) and phthalic anhydride (111.03 parts). |
| B | glycerine (20 parts), itaconic acid (29 parts) and phthalic anhydride (11 parts). |
| C | diethylene glycol (20 parts), itaconic acid (18.2 parts) and succinic acid (7.08 parts). |
| D | ethylene glycol (20 parts), maleic anhydride (29.4 parts) and succinic acid (3.3 parts). |
| E | diethylene glycol (30.3 parts), maleic anhydride (13.2 parts) and phthalic anhydride (21.7 parts). |
| F | glycerine (25.76 parts), maleic anhydride (13.73 parts) and phthalic anhydride (20.72 parts). |

*Copolymers of non-ethylenic-modified unsaturated alkyd resins with monohydric alcohol esters of alpha unsaturated alpha beta polycarboxylic acids*

| Resin | Parts | Monohydric Alcohol Ester | Parts | Characteristics of Copolymer after Interpolymerization at 70° C. for stated time |
|---|---|---|---|---|
| A | 90 | diallyl itaconate | 10 | hard, clear after 24 hours. |
| A | 10 | do | 90 | Do. |
| B | 90 | do | 10 | Do. |
| C | 90 | do | 10 | Do. |
| D | 90 | do | 10 | Do. |
| D | 90 | diethyl itaconate | 10 | Do. |
| F | 80 | diallyl itaconate | 20 | soft, slightly turbid, gel-like after 24 hours. |
| A | 90 | diallyl maleate | 10 | hard, clear after 96 hours. |
| B | 90 | do | 10 | Do. |
| C | 90 | do | 10 | hard, clear after 120 hours. |
| D | 90 | do | 10 | hard, clear after 204 hours. |
| E | 80 | do | 20 | hard, clear after 24 hours. |
| F | 80 | do | 20 | fairly hard, clear after 96 hours. |

It will be understood, of course, that my invention is not limited to the production of copolymers of the particular non-ethylenic-modified unsaturated alkyd resins with the particular monohydric alcohol esters of alpha unsaturated alpha beta polycarboxylic acids set forth in the above examples and that other members of these classes of alkyd resins and monohydric esters, such as hereinbefore mentioned by way of illustration, may be employed in producing the new interpolymerization products of this invention. Also polymerization catalysts other than benzoyl peroxide may be used, for instance accelerators of polymerization such as previously stated.

In certain cases, instead of copolymerizing a single monohydric alcohol ester of an alpha unsaturated alpha beta polycarboxylic acid with a single non-ethylenic-modified unsaturated alkyd resin, I may copolymerize a plurality of the said esters with a single alkyd resin of the kind with which this invention is concerned or with a plurality of such resins. In this way it is possible to obtain a composition comprising a mixture of interpolymers best adapted to meet a particular service application.

It also will be understood that my invention is not limited to the particularly proportions of the individual components given in the above illustrative examples, and that the proportions may be varied depending upon the particular properties desired in the interpolymer. Thus, the incorporation into a polymerizable non-ethylenic-modified unsaturated alkyd resin of as little as 3 or 4 per cent of certain polymerizable monohydric alcohol esters, more particularly unsaturated monohydric alcohol esters of alpha unsaturated alpha beta polycarboxylic acids, e. g., diallyl itaconate, yields copolymers of improved properties as compared with such alkyd resin which has been polymerized in the absence of such ester. However, in many cases it is desirable, particularly where more fluid compositions are required, that the polymerizable monohydric alcohol ester constitute a higher percentage proportion of the initial mixture, say 30 to 70 per cent by weight thereof. Depending upon the particular purpose for which the material is to be used, the percentage proportions of the initial components generally are within the range of 10 to 90 per cent of the monohydric alcohol ester to 90 to 10 per cent of the alkyd resin.

The interpolymerization products of this invention have a wide range of properties. Depending upon the particular starting components, the particular proportions thereof, the nature of the polymerization influences and the extent of the interpolymerization, they vary from soft, flexible, soluble bodies to rubbery and hard, rigid masses of varying resistance to solvents. In intermediate stages of copolymerization some form fluid compositions of varying intrinsic viscosities and may be so used. For coating and impregnating applications where the presence of a small amount of solvent in the cured composition is not objectionable, the mixed polymerizable materials may be diluted with volatile or non-volatile solvents to viscosities best adapted to meet the particular service application, and then may be copolymerized after application of the solution to the particular article to be coated or impregnated. By suitable selection of the starting materials and the conditions of interpolymerization, interpolymers can be obtained in an insoluble, infusible state practically resistant to the destructive effect of other chemical bodies such as acids, bases, solvents and the like.

These new interpolymers may be used alone or with fillers or other modifying agents, for example in casting and molding applications, as adhesives, impregnants and surface coating materials. They may be used as impregnants for many porous bodies, such as cork, pottery, felts, or fabricated bodies with interstices, e. g., the windings of electrical coils, netted fiber, interwoven fibrous materials, etc. They also may be used for protectively coating impervious articles such as metals, or for coating or coating and impregnating articles such as paper, wood, cloth, glass fibers, concrete, synthetic boards, etc. They also may be employed in the production of wire enamels. The mixed components or partial interpolymers thereof, with or without modifying agents, may be cast and molded under heat or under heat and pressure. They also may be molded by injection, extrusion or compression molding technique whereby they are heat- and pressure-hardened to yield molded articles of manufacture for various industrial, household and novelty uses.

What I claim as new and desire to secure by Letters Patent of the United States is:

1. A hard, clear, resinous composition consisting of the product of polymerization of a mixture of copolymerizable materials consisting of diallyl fumarate and a polymerizable esterification product of a polyhydric alcohol, an alpha unsaturated alpha beta polycarboxylic acid and succinic acid.

2. A composition consisting of the product of polymerization of a polymerizable mixture consisting of (1) diallyl fumarate and (2) a polymerizable unsaturated alkyd resin obtained by reaction of ingredients comprising a polyhydric alcohol, itaconic acid and succinic acid, said materials of (1) and (2) being copolymerizable.

3. A composition consisting of the product of polymerization of a polymerizable mixture consisting of (1) diallyl fumarate and (2) a polymerizable unsaturated alkyd resin obtained by reaction of ingredients comprising a dihydric alcohol, an alpha unsaturated alpha beta dicarboxylic acid and succinic acid, said materials of (1) and (2) being copolymerizable.

4. The method of producing new synthetic compositions which comprises polymerizing a polymerizable composition consisting of (1) diallyl fumarate, (2) a polymerizable esterification product of a polyhydric alcohol, an alpha unsaturated alpha beta polycarboxylic acid and succinic acid, said materials of (1) and (2) being copolymerizable, and (3) a catalyst for accelerating the copolymerization of (1) and (2).

GAETANO F. D'ALELIO.

REFERENCES CITED

The following references are of record in the file of this patent:

UNITED STATES PATENTS

| Number | Name | Date |
| --- | --- | --- |
| 2,255,313 | Ellis | Sept. 9, 1941 |